United States Patent [19]

Smith et al.

[11] 4,336,928

[45] Jun. 29, 1982

[54] METHOD FOR FEEDING DOCUMENTS TO A COPY MACHINE

[75] Inventors: Richard E. Smith, Webster; Stephen J. Wenthe, Jr., Rochester; William J. Woznicki, Ontario, all of N.Y.

[73] Assignee: Xerox Corporation, Stamford, Conn.

[21] Appl. No.: 174,789

[22] Filed: Aug. 4, 1980

[51] Int. Cl.³ .................... B65H 3/08; B65H 43/00
[52] U.S. Cl. ............................ 271/3.1; 271/98; 355/35 H; 355/14 SH
[58] Field of Search ............ 271/3.1, 4, 5, 98, 97, 271/105, 106, 104, 35, 94, 95, 96; 355/35 H, 14 SH, 48, 50

[56] References Cited

U.S. PATENT DOCUMENTS 3,627,308 12/1971 Stoever .............................. 271/104
4,212,457  7/1980 Guenther .......................... 271/4 X
4,269,406  5/1981 Hamlin ............................ 271/3.1 X Primary Examiner—Bruce H. Stoner, Jr.

[57] ABSTRACT

A document handler employing a vacuum belt feeder having an air knife to aid in sheet separation. The quantity of air discharged from the air knife is varied in accordance with the number of documents placed in the document handler as determined by counting the documents fed through the document handler during the initial feed cycle.

5 Claims, 5 Drawing Figures

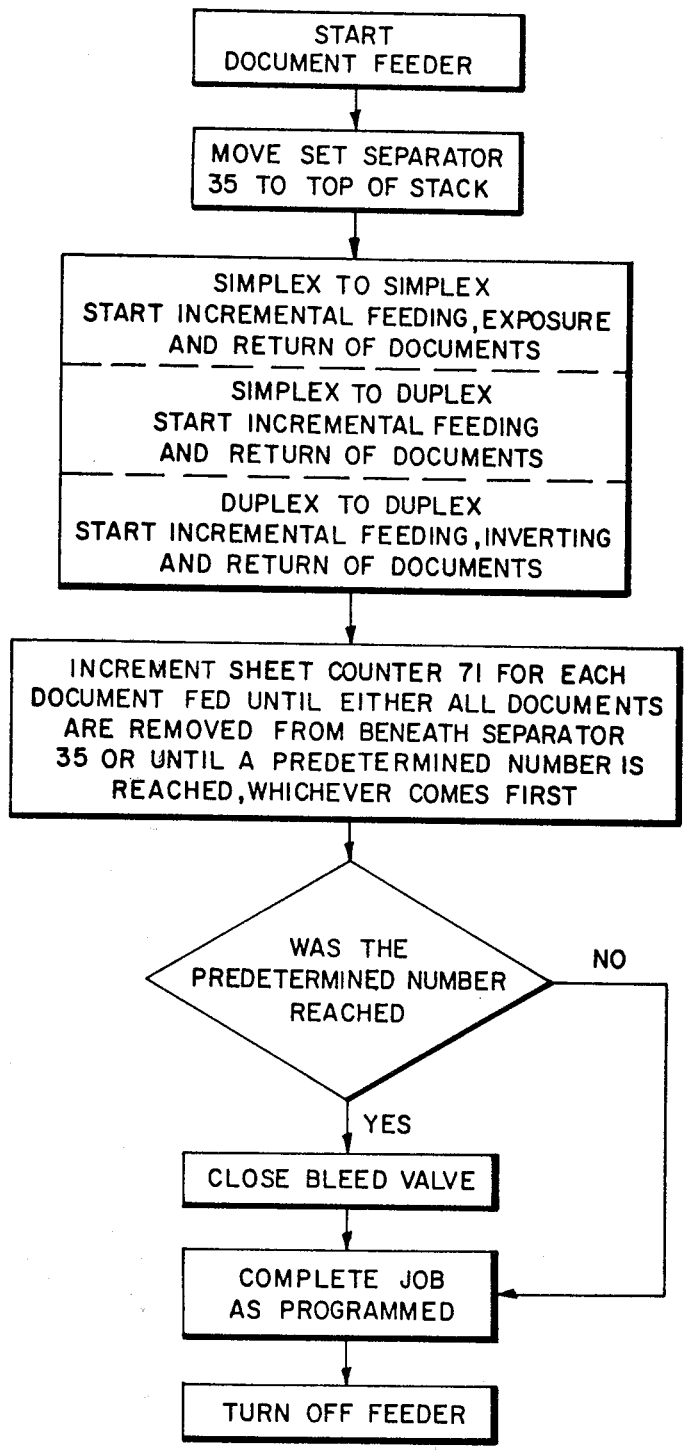

METHOD FOR FEEDING DOCUMENTS TO A COPY MACHINE

With the advent of high speed xerographic copy reproduction machines wherein copies can be produced at a rate in excess of three thousand copies per hour, the need for a document handler to feed documents to the copy platen of the machine in a rapid, dependable matter was recognized to enable full utilization of the reproduction machine's potential copy output. A number of document handlers are currently available to fill that need. These document handlers must operate flawlessly to virtually eliminate the risk of damaging the originals and generate minimum machine shutdowns due to uncorrectable misfeeds or document multifeeds. It is in the initial separation of the individual documents from the document stack where the greatest number of problems occur.

To provide a gentle yet positive feed, a vacuum feed belt assembly may be positioned beneath the stack of documents to be fed for acquiring the bottom document in the stack on the belts by vacuum and energizing the belts to pull the acquired document from under the stack into the document path of the document handler. To prevent misfeeds and multifeeds, an air knife may be positioned at the lead edge of the stack for injecting air between the documents in the stack to provide an air bearing between the document being fed and the remainder of the stack. This greatly reduces the force necessary to pull the bottom document from the stack and also minimizes the possibility of the adjacent document being pulled out from under the stack with the document being fed.

While feed mechanisms have been designed that are self-compensating for various paper thicknesses or stiffness, where the document handler will be used with a large variation in the size of the document stack placed therein, a problem may be encountered in providing the correct air flow from the air knife. With a very small stack of documents, excessive air flow could cause excessive document flutter or in the extreme actually blow documents out of the document tray. With a large stack of documents, insufficient air would not produce the required air bearing or separation between the sheets, resulting in the possibility of misfeeds or multifeeds.

It is therefore an object of this invention to provide a method for varying the air flow from the air knife in a document feeder in relation to the size of the stack of documents placed in the document tray of the feeder.

SUMMARY OF THE INVENTION

A method for varying the air flow from an air knife in a sheet separator for an automatic recirculating document handler, comprising counting the number of documents in the document stack during the first circulation of the documents and, increasing the amount of air supplied to the air knife when the document count is above a preselected number.

BRIEF DESCRIPTION OF THE DRAWINGS

FIG. 5 is a flow chart illustrating the logic sequence for controlling the bleed valve of FIG. 3.

DESCRIPTION OF THE PREFERRED EMBODIMENT

Figure 1:
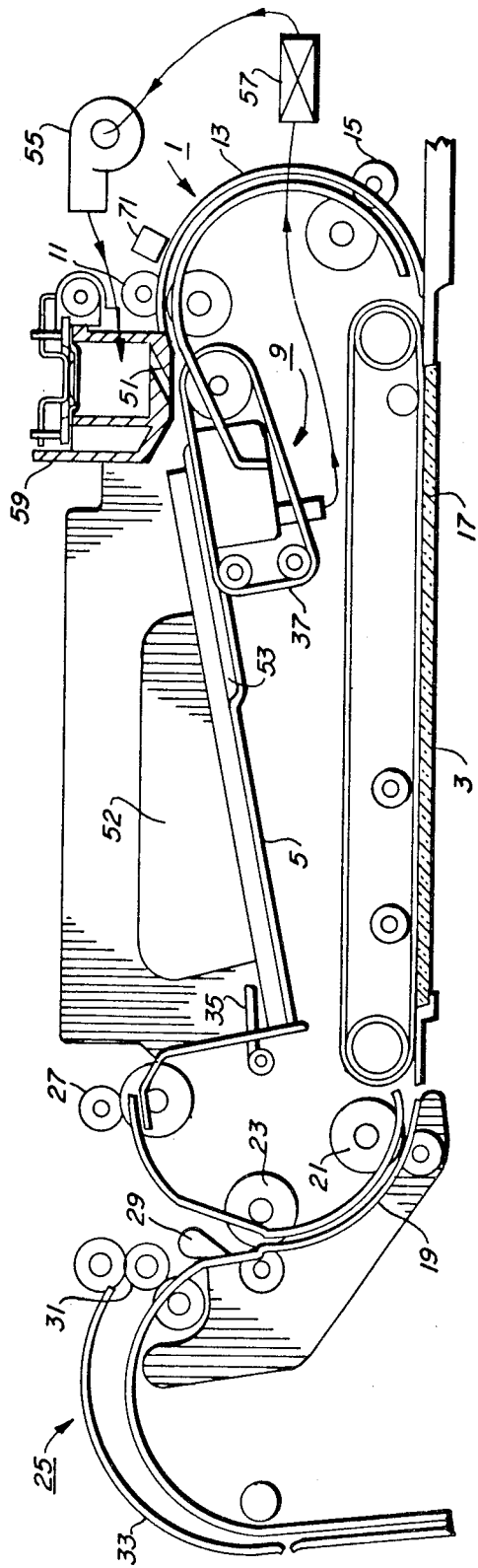
FIG. 1 is a cross-sectional view of an exemplary document handler for practicing the method of the present invention.

Referring to the drawings, there is illustrated an automatic document handler 1 for installation above the exposure platen 3 of a xerographic reproduction machine. The document handler is provided with a document tray 5 to be explained more fully hereinafter, adapted for supporting a stack of documents 7 face up. A vacuum belt-corrugating feeder mechanism 9 is located below the document tray for acquiring and corrugating the bottom document in the stack and forwarding the document to take away roll pair 11 after an air knife 12 has had time to elevate the rest of the stack from sheet 1. The document is then fed by take-away roll pair 11 through document guide 13 to feed-roll pair 15 and under platen belt 17 onto the platen of the copy machine for reproduction. After exposure of the document it is fed off the platen by belt 17 into guide 19 and feed-roll pairs 21 and 23 either to an inverter mechanism 25 or back to the document stack through the feed-roll pair 27. A divertor 29 is provided to divert the document either to the inverter or to the feed roll pair 27. The inverter comprises a three roll arrangement 31 and a closed inverter pocket 33. If the document is to be inverted it is fed through the lower two rolls of the three roll inverter into the pocket. When the trail edge of the document clears the nip of the lower two rolls in the three roll inverter, the stiffness of the sheet will cause the trail edge to straighten up into the nip of the upper two rolls of the inverter at which time it will be fed into roll pair 27 and back into the document stack. The inverter pocket illustrated is sized such that when the leading edge of the document contacts the end of the pocket, the document will buckle slightly within the upper portion of the pocket 33, the buckle thereby providing the required force to feed the trailing edge of the document into the upper roll pair of the inverter rolls for feeding the sheet toward roll pair 27. If desired, an open ended inverter pocket could be utilized having a feed roll pair associated therewith for feeding the document back into the upper roll pair in a positive manner rather than relying on the sheet buckle to feed the document thereto.

The document handler is also provided with a sheet separator finger 35 as is well known in the art to separate the documents to be fed from those documents returned to the document handler. Upon removal of the last document from beneath sheet separator finger 35, the finger 35 drops through a slot provided in the tray, suitable sensors (not shown) are provided to sense that the last document in the set has been removed from the tray and the finger is then rotated in a clockwise direction to again come to rest on the top of the documents in the stack prior to subsequent recirculation of the document set.

Figure 2:
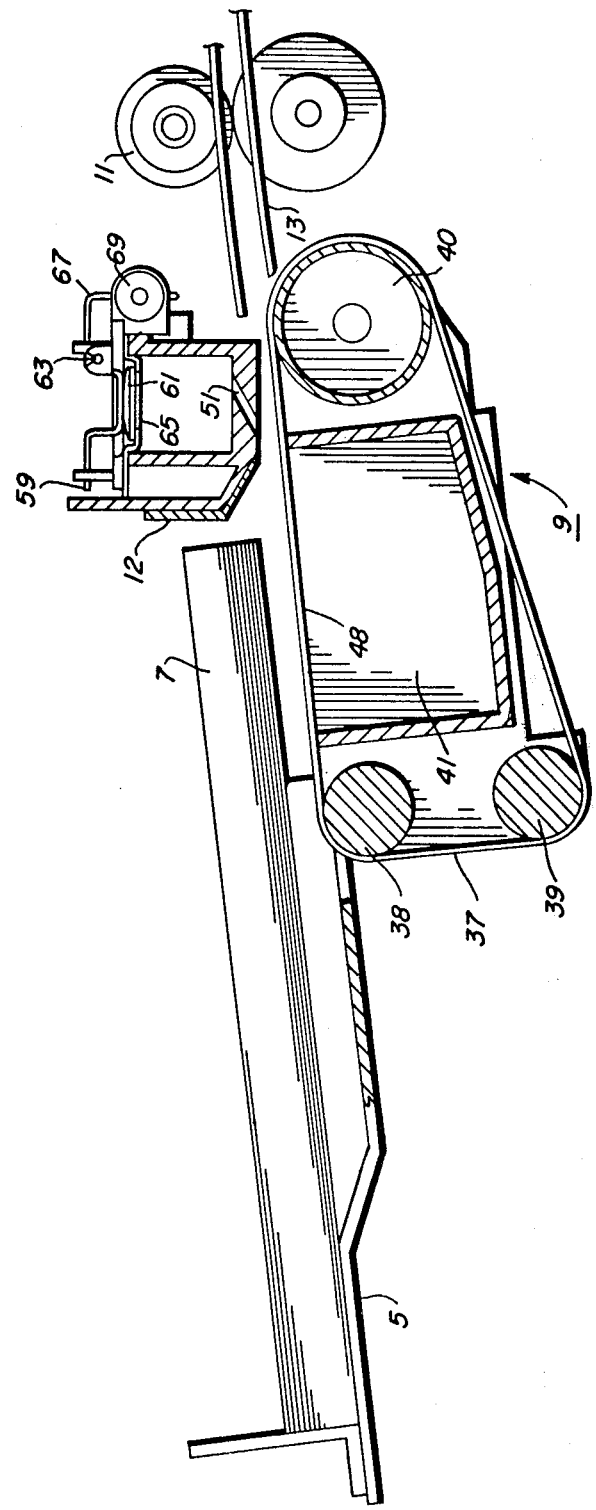
FIG. 2 is an enlarged, cross-sectional view of the separator-feeder portion of the document handler of FIG. 1.
Figure 4:
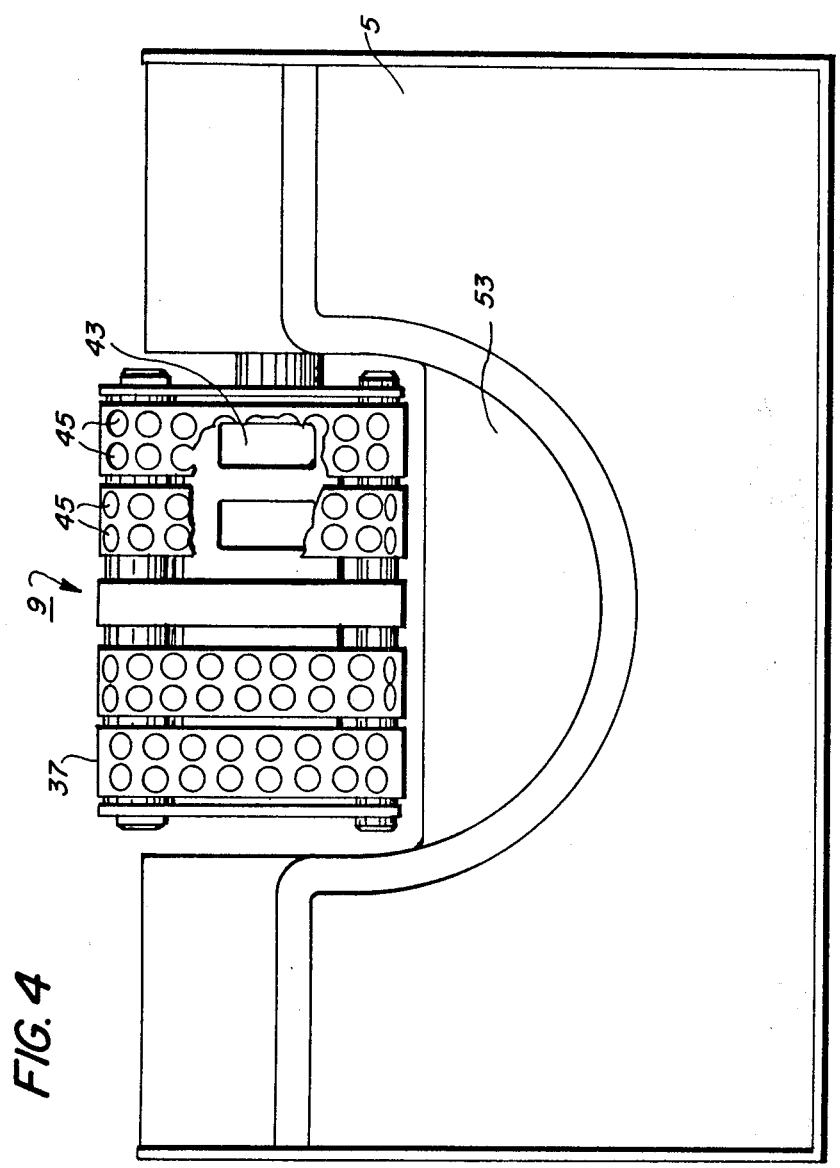
FIG. 4 is a top view of the document tray and feed belts of the document handler illustrated in FIG. 1.

Referring more particularly to FIGS. 2, and 4 wherein the document separator-feeder is more clearly illustrated, there is disclosed a plurality of feed belts 37 supported for movement on feed belt rolls 38, 39, and 40. Spaced within the run of the belts 37 there is provided a vacuum plenum 41 having openings 43 therein adapted for copperation with perforations 45 in the belts 37 to provide a vacuum for pulling the bottom document in the document stack onto the belts 37. As can be seen from FIG. 2, the belts are below the surrounding support surfaces. Thus the document is corrugated thereby. In the unlikely event that more than one document is pulled down into contact with the feed belts, the beam strength of the second document resists the corrugating action, thus gaps are opened between sheets one and two which extend to their lead edges. These gaps and channels reduce the vacuum levels between sheets one and two due to porosity in sheet one and provide for entry of the separating air flow from the air knife 12. The air knife 12 comprised of pressurized air plenum 50 having a plurality of air jet openings 51 is provided to inject air into the pocket formed between the document pulled down against the feed belt and the documents thereabove to provide an air cushion or bearing between the stack and the bottom document to minimize the force necessary for removing the bottom document from the stack. It can be understood that if two documents are pulled down toward the belts 37, since the top sheet would not be corrugated, the air knife would inject air into the space between the two documents and force the second document off from the raised belt back toward the document stack.

By reference to FIGS. 1, 2 and 4 it can be seen that the document tray 5 is provided with a depressed portion or pocket 53 behind the feed belt assembly. This pocket serves a number of purposes. First, space is provided for the forward portion of the bottom document to be pulled down onto the feed belt assembly. When the bottom document is pulled into this space and corrugated, an envelope type opening or pocket is created between the bottom sheet and the remainder of the sheets in the stack. Air injected into this space from the air knife produces an air bearing between the bottom sheet and the remainder of the stack to allow easy removal of the bottom sheet from beneath the stack. Flow of air from the pocket is restricted by the partial seal or flow restriction caused by supporting the major portion of the stack weight on the edge portions of the tray surrounding the pocket.

By reference to FIG. 1, it can be seen that a single blower unit 55 is utilized to provide subatmospheric pressure in plenum 41 and pressurized air to air knife 12. A valve 57 is provided in the inlet line to blower 55. With the disclosed system, the blower is operated continuously and air flow through the system is controlled by opening and closing valve 57. At the start of the feed cycle, the valve is opened. Upon opening of the valve, the flow of air from the air knife is greater than the steady state air flow i.e., the pressure and initial air flow "spikes". This initial high flow of air provides the required lifting force to float the sheet stack, which settles onto the tray between feed cycles. Once the stack is lifted by this air "spike", the lower steady state flow of air from the knife is sufficient to maintain the stack in the raised or "floating" position.

At approximately the same time that the air pressure at the air knife "spikes", the bottom sheet is acquired on the vacuum feed belts, thereby maximizing blower inlet vacuum and subsequent reduction of air flow to the air knife to the steady state level.

Following the feed cyvle the air valve 57 is closed. This shuts off air flow to the air knife, allowing the sheet stack to settle back down on the tray and allowing documents to be returned to the tray for restacking without encountering opposing air flow from the air knife.

In order to compensate for variations in the number of documents placed in the document tray and thus assure adequate air flow from the air knife to lift large stacks of documents while at the same time, provide a reduced air flow for small stacks of documents to prevent sheet blow away, a bleed valve 59 is provided.

Figure 3:
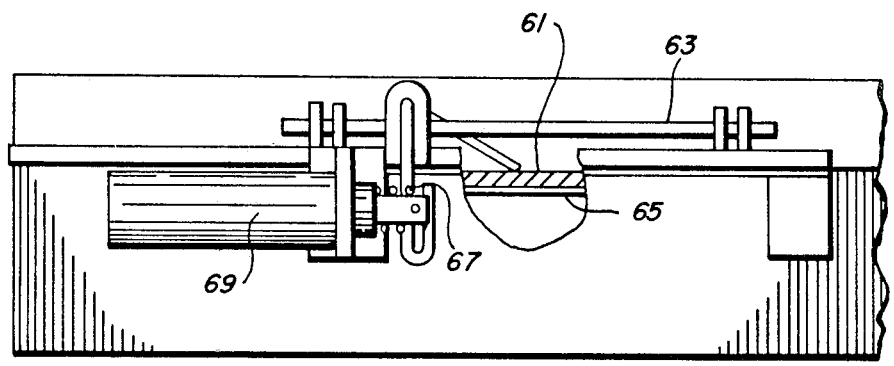
FIG. 3 is a view of the air knife assembly with a solenoid actuated bleed valve therein suitable for use with the document handler of FIG. 1 to increase the air flow discharged from the air knife jets when a large number of documents are stacked in the document handler.

By reference to FIGS. 1, 2 and 3, it can be seen that the valve comprises a flap or door 61 adapted to pivot about an axis 63 to open or close an opening 65 in the top of the air knife 12. A pivoting bail 67 adapted to be pivoted in contact with flap 61 by a solenoid 69 maintains flap 61 closed when full air knife pressure is desired. The solenoid may be deenergized when small sheet stacks are placed in the document handler thereby allowing air pressure to lift flap 61 and uncover opening 65 to bleed air from the air knife.

Through suitable control logic, the sequence of which is illustrated in FIG. 5, the bleed valve may be mantained in an open or closed position in accordance with the number of documents placed in the stack. In the disclosed embodiment, this is accomplished by placing the documents to be copied in the document tray, programming the copy machine associated with the document handler for the desired number of copies to be produced and pressing the start button which is the normal sequence of operation for the majority of copiers now on the market. Upon initial energization of the machine, the set separator 35 will be rotated from its position beneath the documents in the stack to a position above the document in the stack. Once the separator 35 is in the proper start position, the various machine elements will be energized such as the blower 55, the feed rolls, document belts, etc.

Upon initial start up, solenoid 69 is not energized, thereby allowing a portion of the air supplied to the air knife to bleed through opening 65.

If simplex copies are to be produced, the control logic will cause feeding of documents from the tray and production of copies therefrom. A counter 71 is provided to count the number of documents removed from the stack on the first circulation. In the preferred embodiment, if the counter counts more than seven documents, the machine switches immediately (at the eight count) to high air flow by energizing solenoid 69 to shut opening 65 so that all air supplied by the blower will be discharged through openings 51.

Since the disclosed document handler is adapted to invert documents to allow simplex to duplex or duplex to duplex copying if the copy machine with which it is utilized has the proper capabilities, when the machine is programmed for producing duplex copies from simplex documents or duplex copies from duplex documents, the first circulation of documents would be a document "slew" to enable counting or inverting of the documents to enable the machine logic to set up the proper copy sequence. Under these conditions, the documents being circulated in the "slew" mode will be counted by counter 71. Again, in the preferred embodiment, if the counter counts more than seven documents, the machine switches immediately (at the eight count) to high air flow by energizing solenoid 69 to shut opening 65 so that all air supplied by the blower will be discharged through openings 51.

Thus, whenever a stack of documents is placed in the document handler and the machine is programmed for the desired copy sequence, the documents are counted on their first pass through the document handler to obtain a copy count, which count is utilized to close the bleed valve assembly 59 to tailor the output of the air knife to the document stack size. As stated heretofore, this will prevent document blow away of small document stacks which could occur in the event that a constant output air knife were utilized and yet provide sufficient air for large document stacks when necessary.

While the preferred method for controlling the operation of the disclosed document handler is to initially start the document handler with reduced air flow through the air knife and increase the flow if necessary, it should be understood that under certain circumstances, it may be desireable to initially start the system at a high air flow and then reduce the flow if necessary.

While we have described the preferred embodiment of our invention, it is to be understood that the invention is not limited to but may be otherwise embodied within the scope of the following claims.

We claim:

1. A method for controlling the operation of an automatic document handler having air flotation means associated with the document separator-feeder mechanism of the document handler to increase the document latitude of handling ability of the feeder comprising the steps of;

circulating the documents through the document handler, counting the number of documents fed, comparing the number of documents counted to a predetermined number, and adjusting the quantity of air discharged from said air flotation means so that more air is discharged when said counted number is greater than said predetermined number.

2. A method according to claim 1 wherein said automatic document handler is used for feeding documents to be copied in a copier and wherein said counting step is accomplished by feeding the documents through the document handler while making copies thereof and counting the number fed during the first circulation of the documents when producing simplex copies.

3. A method according to claim 2 wherein the step of adjusting the quantity of air discharged from the air flotation means is accomplished by bleeding air from the air flotation means when less air is required thereby.

4. A method according to claim 1 wherein said automatic document handler is used for feeding documents to be copied in a copier and wherein said counting step is accomplished by feeding the docuements through the document handler without making copies thereof and counting the number fed when producing simplex to duplex or duplex to duplex copies.

5. A method according to claim 1 wherein the step of adjusting the quantity of air is accomplished by the steps of bleeding air from the air flotation means upon initial start up of the document handler, and closing the air bleed means on the first document circulation when the counted number of circulated documents exceeds the predetermined number.

* * * * *